(12) United States Patent
Ishibe

(10) Patent No.: US 7,428,088 B2
(45) Date of Patent: Sep. 23, 2008

(54) OPTICAL SCANNING APPARATUS AND METHOD FOR ADJUSTING THE SAME

(75) Inventor: Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 11/246,203

(22) Filed: Oct. 11, 2005

(65) Prior Publication Data

US 2006/0092492 A1    May 4, 2006

(30) Foreign Application Priority Data

Oct. 28, 2004   (JP) .............................. 2004-313341

(51) Int. Cl.
   *G02B 26/08*   (2006.01)
   *B41J 27/00*   (2006.01)

(52) U.S. Cl. ....................... 359/207; 359/205; 359/210; 359/900; 347/259

(58) Field of Classification Search .................. 359/207
   See application file for complete search history.

(56) References Cited

U.S. PATENT DOCUMENTS 6,785,028 B1 *   8/2004   Atsuumi et al. ............. 359/196

7,142,339 B2 *   11/2006  Tomioka ..................... 359/204
2006/0238849 A1  10/2006  Ishibe ........................ 359/207

FOREIGN PATENT DOCUMENTS

| EP | 872754 | 10/1998 |
|---|---|---|
| EP | 1336889 | 8/2003 |
| JP | 5-313089 | 11/1993 |
| JP | 2001-324687 | 11/2001 |

* cited by examiner

*Primary Examiner*—James Phan
(74) *Attorney, Agent, or Firm*—Fitzpatrick, Cella, Harper & Scinto

(57) ABSTRACT

An optical scanning apparatus which is free from any deterioration of drawing performance and which can be miniaturized and simplified in overall configuration, and an image forming apparatus using the optical scanning apparatus are provided. The optical scanning apparatus includes: a light source unit; an incident optical system for guiding a light beam emitted from the light source unit to a deflecting unit; and an imaging optical system for guiding the light beam deflected by the deflecting unit onto a surface to be scanned. The incident optical system includes an anamorphic condenser lens having a refractive power in a main scanning cross section and a refractive power in a sub-scanning cross section which are different from each other, and the imaging optical system has a refractive power with which a deflective surface of the deflecting unit or a vicinity of the deflective surface and the surface to be scanned are made in conjugate relation with each other, and also satisfies a conditional expression.

14 Claims, 6 Drawing Sheets

OPTICAL SCANNING APPARATUS AND METHOD FOR ADJUSTING THE SAME

BACKGROUND OF THE INVENTION

1. Field of the Invention

The present invention relates to an optical scanning apparatus and an image forming apparatus using the optical scanning apparatus, and more specifically relates to an optical scanning apparatus in which a collimator lens and a cylindrical lens between a light source means and a light deflector are integrally configured to miniaturize and simplify the whole apparatus.

The present invention relates to an optical scanning apparatus suitable for a laser beam printer (LBP), a digital copying machine, a multifunction printer (multiple function printer), and the like employing an electrophotographic process, for example.

2. Related Background Art

Conventionally, in an optical scanning apparatus used for a laser beam printer, a digital copying machine, and the like, a light beam optically modulated and radiated from a light source means in accordance with an image signal is periodically deflected by a light deflector formed by a polygon mirror and the like, for example, and the light beam is condensed into a spot on a surface of a photosensitive recording medium by an imaging optical system configured by an fθ lens and the like, and the surface is optically scanned, thereby carrying out image recording.

FIG. 7 is a schematic diagram of a main portion of a conventional optical scanning apparatus of this kind.

In FIG. 7, a diverged light beam emitted from a light source means 91 is made to be a substantially parallel light beam or a converged light beam by a collimator lens 92, the light beam (light amount) is shaped by an aperture diaphragm 93, and the light beam is made incident upon a cylindrical lens 94 having a refractive power in a sub-scanning cross section only.

The light beam incident upon the cylindrical lens 94 is emitted as it is in a main scanning cross section. On the other hand, the light beam incident upon the cylindrical lens 94 is converged and imaged as a substantially linear image including a linear image in a vicinity of a deflecting surface 95a of a light deflector 95 configured by a rotary polygon mirror in the sub-scanning cross section.

The light beam reflected and deflected on the deflecting surface 95a of the light deflector 95 is guided onto a photosensitive drum surface 97 which is a surface to be scanned, via an imaging optical system (fθ lens system) 96 having an fθ characteristic.

The recording of image information is carried out by performing optical scanning on the photosensitive drum surface 97 in a direction of an arrow B (main scanning direction) by rotating the light deflector 95 in a direction of an arrow A.

Note that each element such as the collimator lens 92, the cylindrical lens 94, and the like constitutes one element of an incident optical system LA.

In recent years, with regard to the optical scanning apparatus and the image forming apparatus of this type, the demand for miniaturization and simplification (cost reduction) of the whole apparatus has increased.

In order to satisfy the demand, an apparatus in which the incident optical system having the collimator lens 92, the cylindrical lens 94, and the like, for example, is configured by one single anamorphic condenser lens (anisotropic refractive power single lens) (see U.S. Pat. No. 4,915,484).

In the U.S. Pat. No. 4,915,484, the simplification and the miniaturization of the apparatus are realized by forming the conventional incident optical system, which is configured by the collimator lens and the cylindrical lens, by one single anamorphic condenser lens.

Besides, a post-objective type imaging optical system using the anamorphic condenser lens (anisotropic refractive power single lens) capable of effecting functions of the collimator lens, two prisms, the cylindrical lens, and the like with one lens has been proposed (see Japanese Patent Application Laid-open No. H05-313089).

Japanese Patent Application Laid-open No. H05-313089 discloses the post-objective type imaging optical system in which a focal length in the main scanning cross section, in the whole optical system, is about ten times larger than the focal length in the sub-scanning cross section.

In Japanese Patent Application Laid-open No. H05-313089, the complex incident optical system structured by the collimator lens, two prisms, the cylindrical lens, and the like designed to prevent a decrease in the utilization efficiency of light is configured by one single anamorphic condenser lens, and by adapting the configuration of the anamorphic condenser lens as appropriate, it is possible to maintain the utilization efficiency of the light.

However, the anamorphic condenser lens as disclosed in U.S. Pat. No. 4,915,484 is configured by a glass-formed lens constituted by a glass lens. Accordingly, there is a problem in that the anamorphic condenser lens is difficult to manufacture (the cost is high) compared to a plastic-formed lens capable of being formed with short molding tact.

Just as the anamorphic condenser lens as disclosed in U.S. Pat. No. 4,915,484, the anamorphic condenser lens as disclosed in Japanese Patent Application Laid-open No. H05-313089 is configured by the optical glass, and therefore has a problem that it is difficult to manufacture.

Further, in U.S. Pat. No. 4,915,484 and Japanese Patent Application Laid-open No. H05-313089, adjustment (collimator adjustment) of degree of convergence (parallelism) of the light beam emitted from the anamorphic condenser lens is not disclosed.

Hereinbelow, an explanation is made as to the incident optical system configured by the conventional collimator lens and the cylindrical lens.

The incident optical system configured by the collimator lens and the cylindrical lens has a configuration such that the adjustment of the convergence degree (parallelism) of the light beam emitted from the incident optical system is carried out by moving the collimator lens in the main scanning cross section and by moving the cylindrical lens in the sub-scanning cross section in a direction of an optical axis.

That is, in the conventional optical scanning apparatus, it is possible to carry out the adjustments in the main scanning cross section and in the sub-scanning cross section, independently.

However, in the conventional optical scanning apparatus, there is a problem such that in a case where the collimator lens and the cylindrical lens are integrally configured, it is not possible to carry out the adjustments in the main scanning cross section and in the sub-scanning cross section, independently.

An object of the present invention is to provide an optical scanning apparatus that can be miniaturized and simplified as a whole, and an image forming apparatus using the same.

SUMMARY OF THE INVENTION

An optical scanning apparatus according to the present invention includes: a light source unit; an incident optical system for guiding a light beam emitted from the light source unit to a deflecting unit; and an imaging optical system for guiding the light beam reflected by the deflecting unit onto a surface to be scanned, in which a deflecting surface of the deflecting unit or a vicinity of the deflecting surface and the surface to be scanned satisfies a conjugate relation in a sub-scanning cross section. The optical scanning apparatus is characterized in that: the incident optical system includes an anamorphic condenser lens having an optical power in a main scanning direction and an optical power in a sub-scanning direction, the optical power in the main scanning direction and the optical power in the sub-scanning direction being different from each other; and the imaging optical system satisfies the following conditions: $1 \leq \beta^2$; and $\beta^2 \leq 23.56 \times w_0^2/\lambda_0$, where $\beta$ represents a lateral magnification of the imaging optical system in the sub-scanning direction, $w_0$ represents a beam radius in a beam waist position of an imaging spot condensed by the imaging optical system in the sub-scanning direction, and $\lambda_0$ (mm) represents a wavelength of the light beam emitted from the light source unit.

According to the present invention, it is possible to achieve the optical scanning apparatus in which there occurs no deterioration of drawing performance and the whole of which can be miniaturized and simplified and the image forming apparatus using the same by configuring a condensing optical system by one single anamorphic condenser lens and by properly setting each element.

Figure 3:
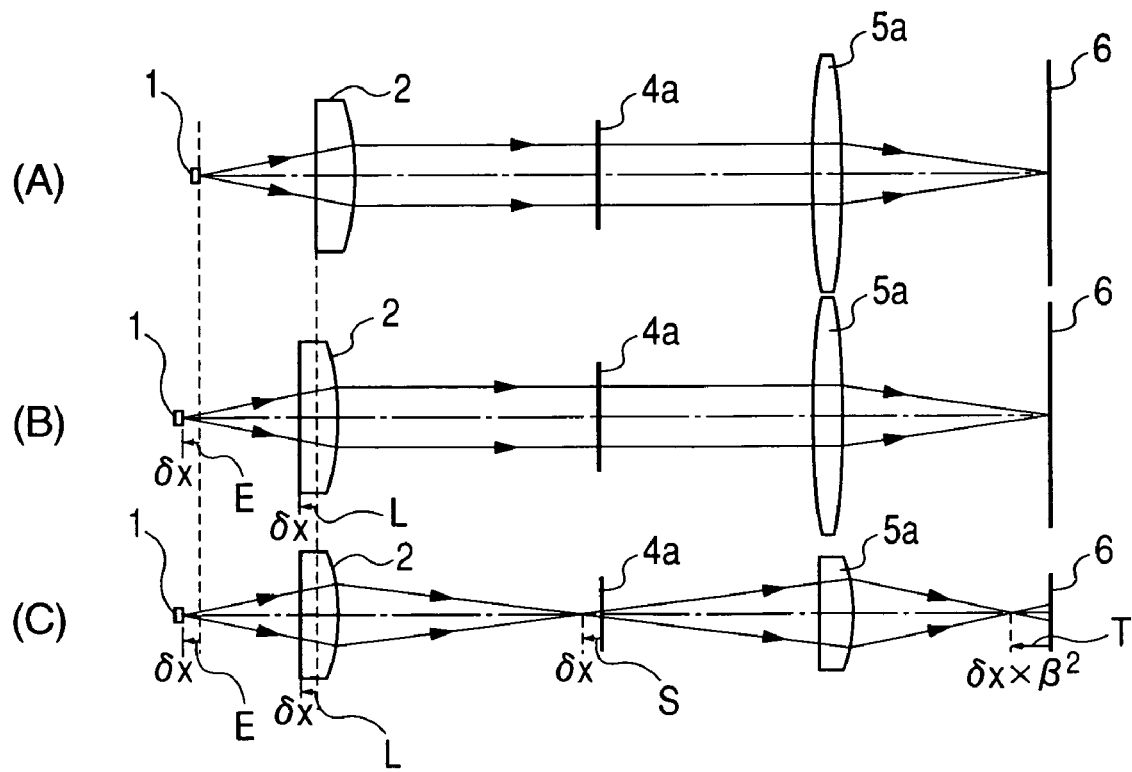
Figure 4:
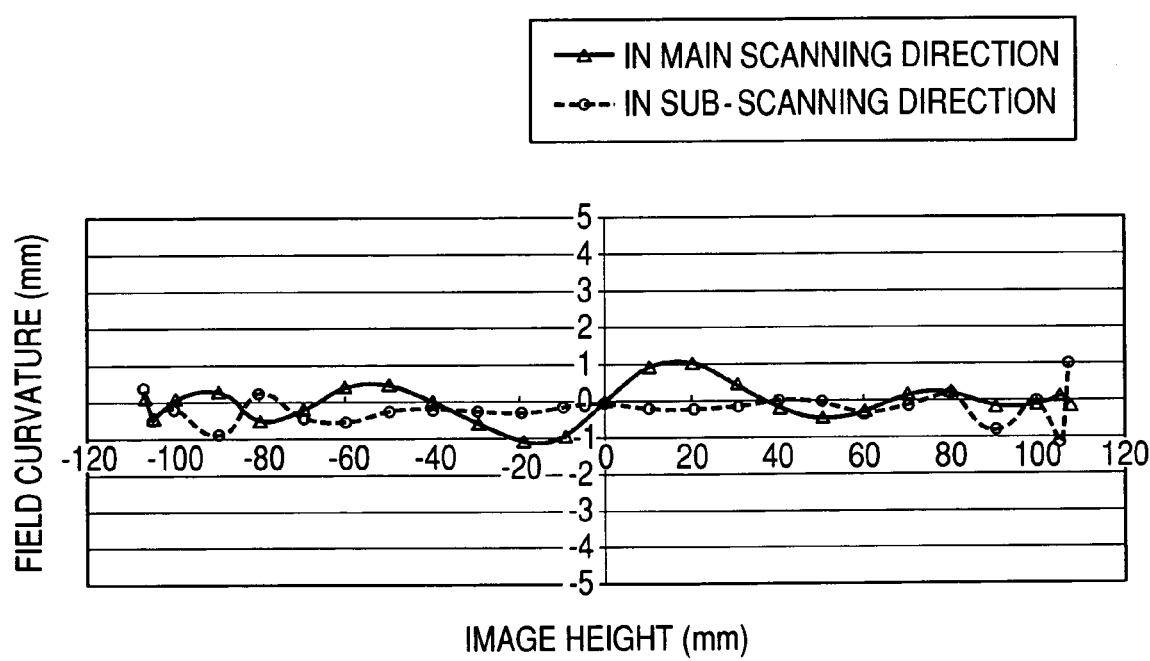
Figure 5:
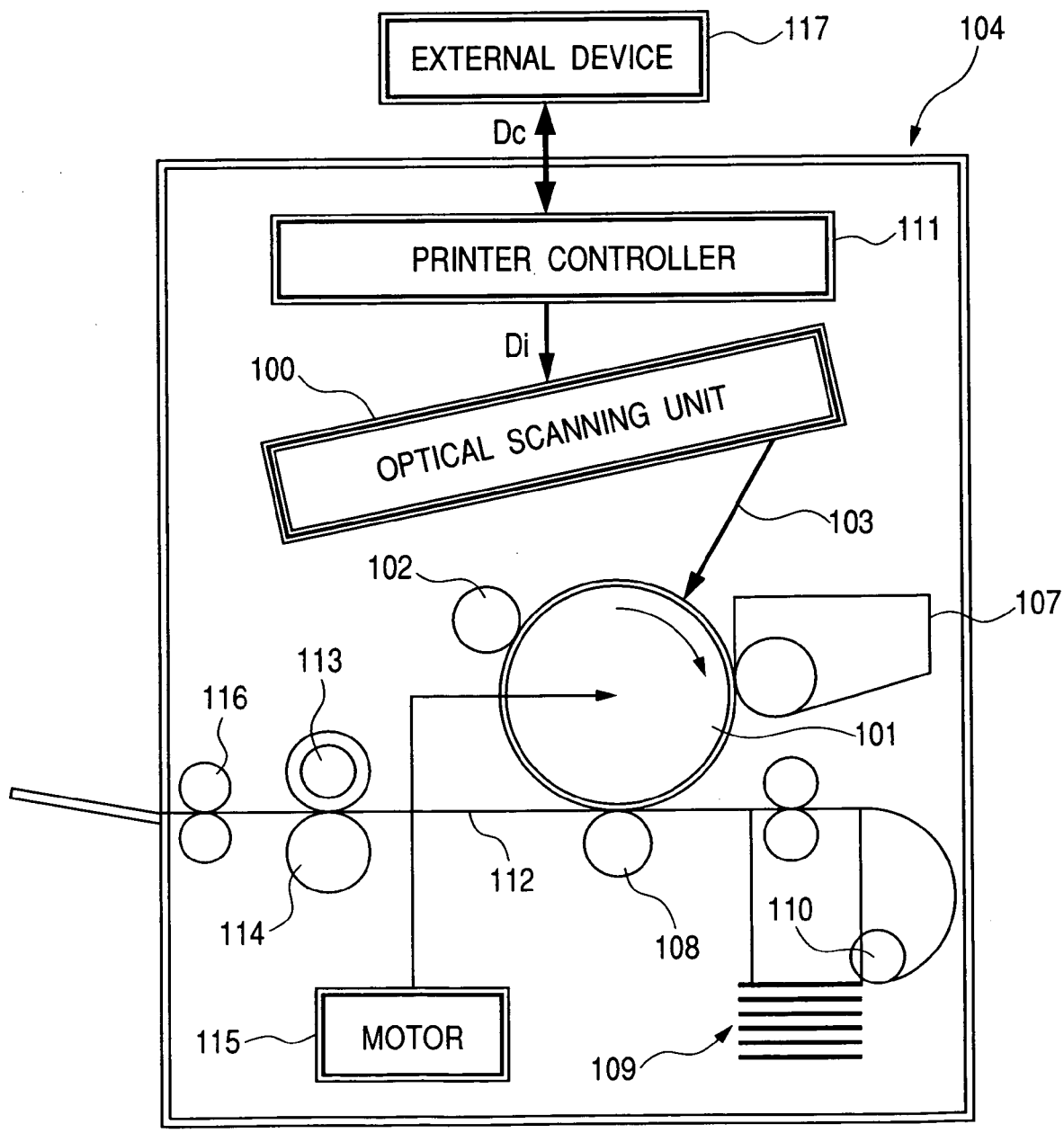
Figure 6:
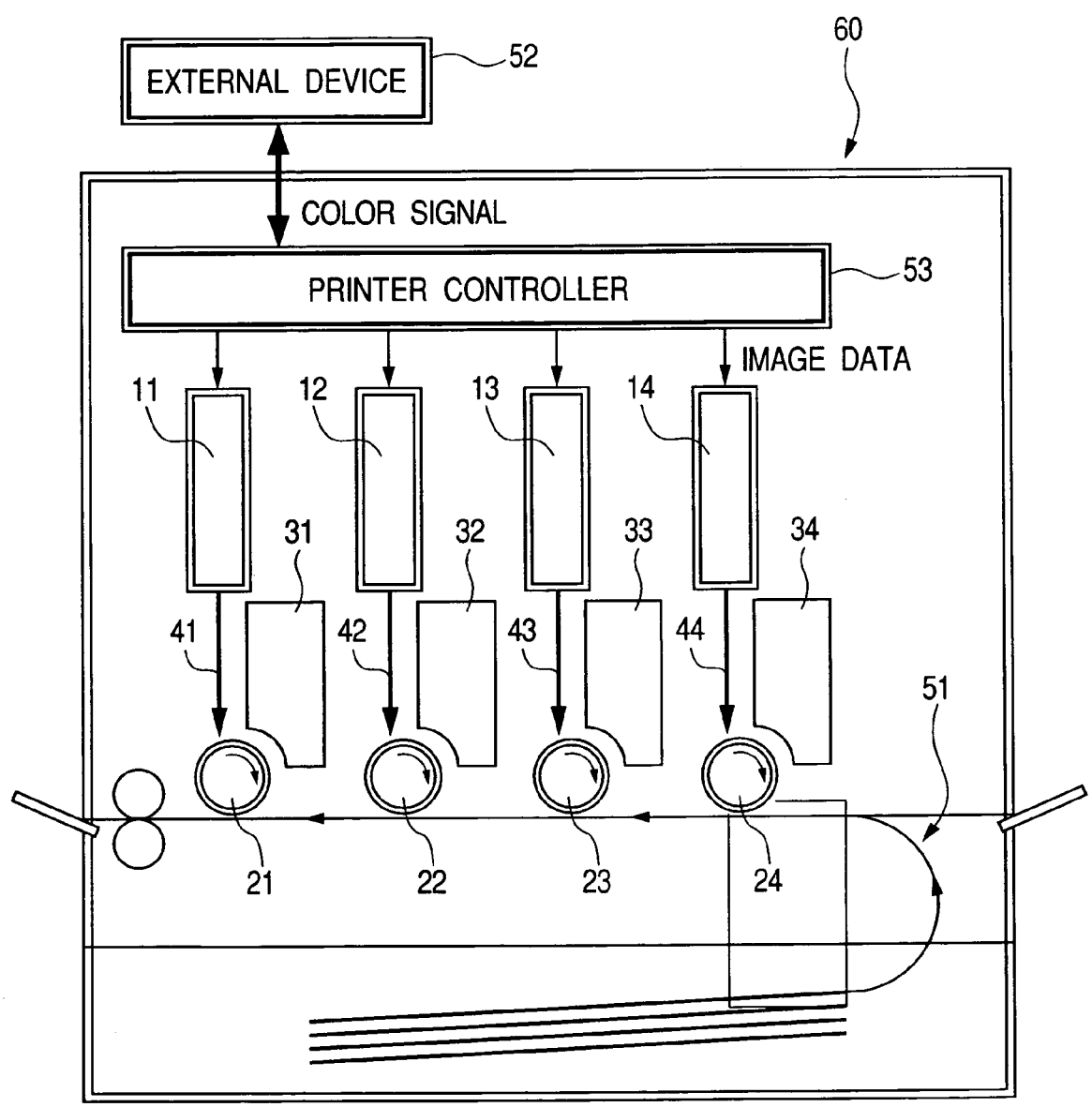
Figure 7:
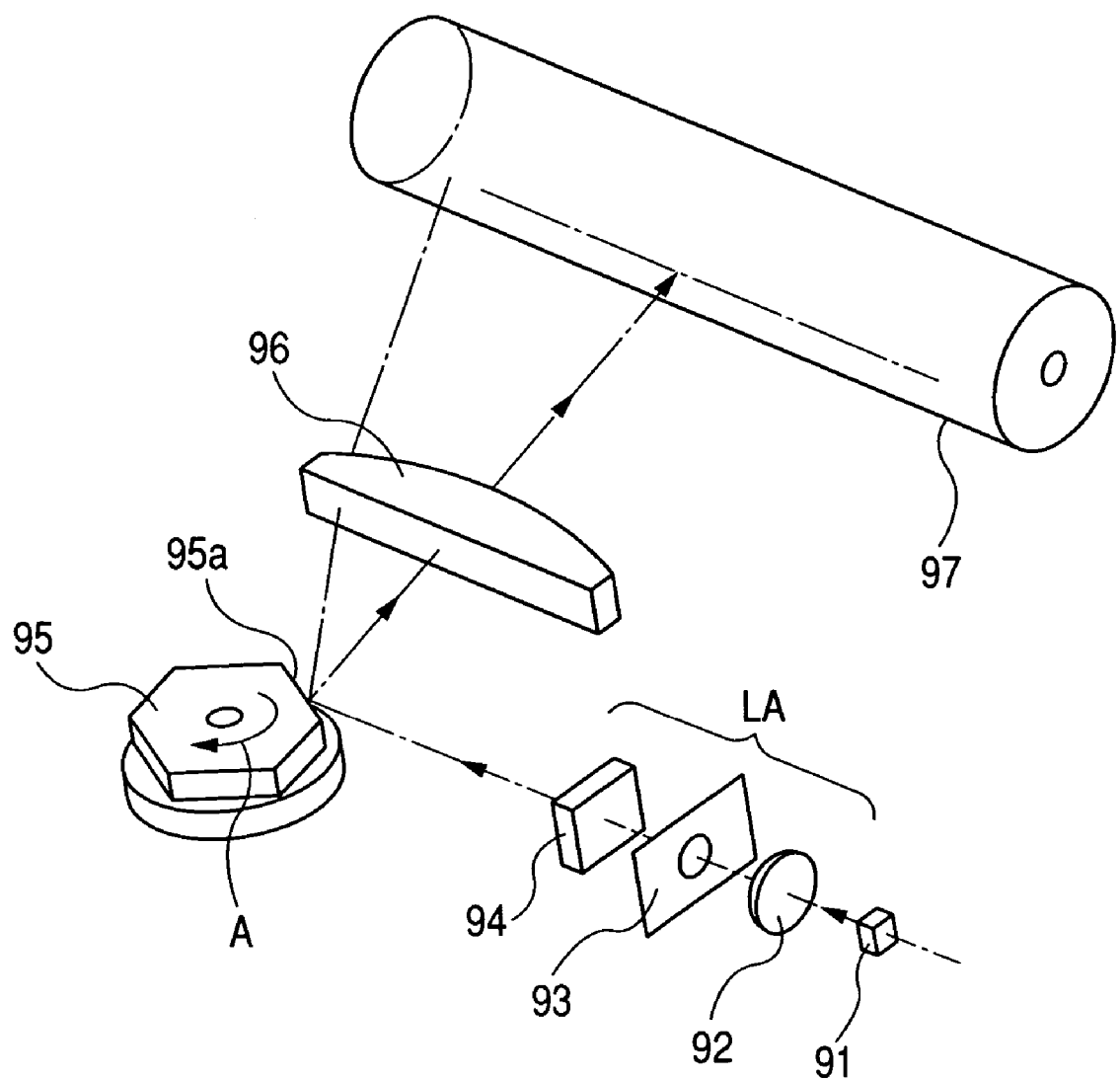

(A), (B) and (C) of FIG. 3 show main scanning cross sectional views and sub-scanning cross sectional views of an optical system according to the first embodiment of the present invention;

FIG. 4 is a view showing field curvatures in a main scanning direction and a sub-scanning direction according to the first embodiment of the present invention;

FIG. 5 is a sub-scanning cross sectional view showing an embodiment of an image forming apparatus according to the present invention;

FIG. 6 is a schematic diagram of a main portion of a color image forming apparatus according to an embodiment of the present invention; and FIG. 7 is a schematic diagram of a main portion of a conventional optical scanning apparatus.

DESCRIPTION OF THE PREFERRED EMBODIMENTS

Hereinafter, embodiments of the present invention will be explained with reference to the drawings.

First Embodiment

Figure 1:
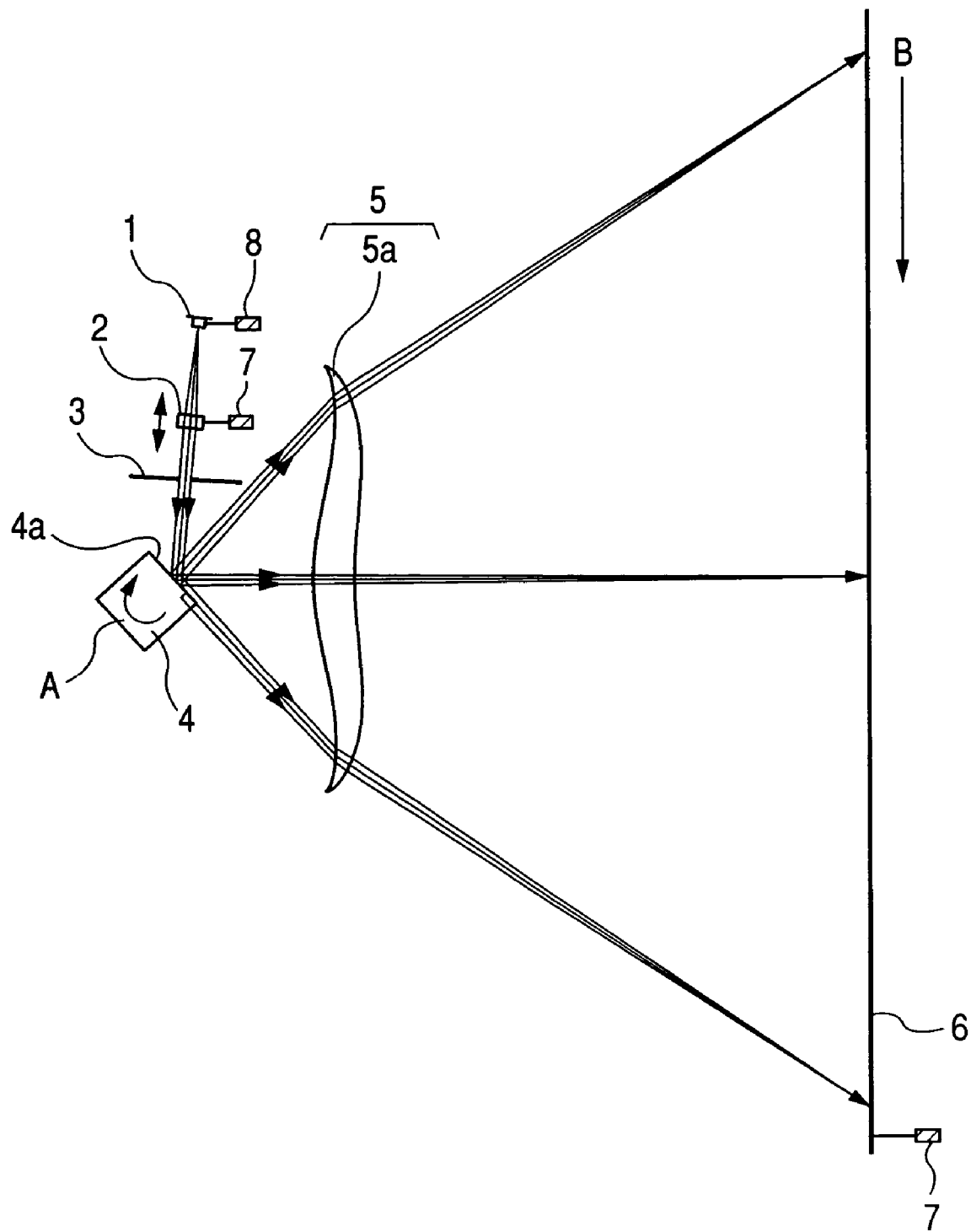
FIG. 1 is a main scanning cross sectional view according to a first embodiment of the present invention.
Figure 2:
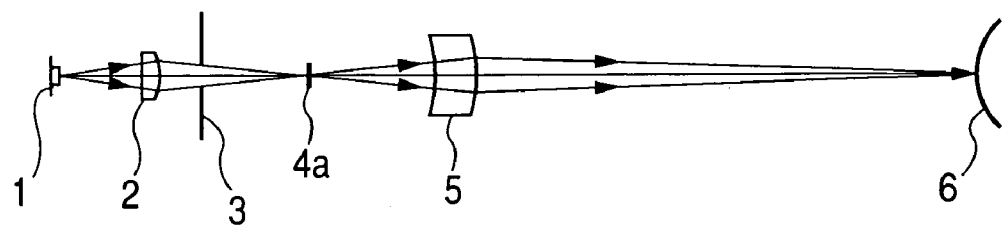
FIG. 2 is a sub-scanning cross sectional view according to the first embodiment of the present invention.

FIG. 1 is a cross section of a main portion according to a first embodiment of the present invention in a main scanning direction (main scanning cross section), and FIG. 2 is a cross section of a main portion according to the first embodiment of the present invention in a sub-scanning direction (sub-scanning cross section).

Here, the main scanning direction indicates a direction orthogonal to a rotational axis of a deflecting means and an optical axis of an imaging optical system (direction in which the light beam is reflected and deflected, that is, deflected to be scanned by the deflecting means); and the sub-scanning direction indicates a direction parallel to the rotational axis of the deflecting means.

Besides, the main scanning cross section indicates a plane which is parallel to the main scanning direction and includes the optical axis of the imaging optical system. In addition, the sub-scanning cross section indicates a cross section orthogonal to the main scanning cross section.

In FIG. 1 and FIG. 2, reference numeral 1 denotes a light source means having one light emitting portion. The light source means 1 is configured by a semiconductor laser, for example.

Reference numeral 2 denotes an incident optical system. The incident optical system 2 condenses a light beam emitted from the light source means 1. The incident optical system 2 in this embodiment is provided with an anamorphic condenser lens (anisotropic refractive power single lens) in which a refractive power in the main scanning cross section and a refractive power in the sub-scanning cross section are different from each other.

Reference numeral 3 denotes an aperture diaphragm. The aperture diaphragm 3 shapes a beam shape by restricting a passing light beam.

Reference numeral 4 denotes a light deflector as a deflecting means for deflecting the light beam emitted from the incident optical system 2 in the main scanning direction. The light deflector 4 is configured by a four-side configuration polygon mirror (rotary polygon mirror), for example. The light deflector 4 rotates at a constant speed in a direction of an arrow A in FIG. 1 by a driving means (not shown) such as a motor.

Reference numeral 5 indicates the imaging optical system (fθ lens system) having a condensing function and an fθ characteristic. The imaging optical system 5 is configured by a single scanning lens (fθ lens) 5a composed of a plastic material.

The imaging optical system (fθ lens system) 5 forms the image of the light beam based on image information reflected and deflected by the light deflector 4 on a photosensitive drum surface 6 which is a surface to be scanned.

In addition, the imaging optical system 5 (fθ lens system) is provided with an optical face tangle error correction function by making a deflecting surface 4a of the light deflector 4 or the vicinity of the deflecting surface 4a conjugate with the photosensitive drum surface 6 in the sub-scanning cross section.

Reference numeral 6 denotes the photosensitive drum surface as the surface to be scanned.

Reference numeral 7 denotes an anamorphic condenser lens adjustment means. The anamorphic condenser lens adjustment means 7 adjusts a condensing state of the light beam on the surface 6 to be scanned in the main scanning direction and in the sub-scanning direction by moving the anamorphic condenser lens 2 along a traveling direction of the light beam.

That is, the anamorphic condenser lens adjustment means 7 of this embodiment directly observes the condensing state of the light beam on the surface 6 to be scanned, and carries out the adjustment so that a beam diameter of an imaging spot of the light beam in the main scanning direction becomes minimum.

Reference numeral 8 denotes a first adjustment means. The first adjustment means 8 moves the light source means 1 within a plane orthogonal to an optical axis of the anamorphic condenser lens 2 in order to adjust a condensing position of the light beam on the surface 6 to be scanned.

In this embodiment, the light beam optically modulated by and emitted from the light source means 1 in accordance with the image information is converted into a substantially parallel light beam including a parallel light beam (or a substantially converged light beam including a converged light beam) in the main scanning cross section by the anamorphic condenser lens 2, and then passes through the aperture diaphragm 3 (and is partially shielded).

In addition, the light beam optically modulated by and emitted from the light source means 1 in accordance with the image information is converged in the sub-scanning direction to pass the aperture diaphragm 3 (and is partially shielded). The image of the light beam is formed as a substantially linear image including a linear image (linear image elongated in the main scanning direction) on the deflecting surface 4a of the light deflector 4, in the sub-scanning cross section.

Besides, the image of the light beam reflected and deflected on the deflecting surface 4a of the light deflector 4 is formed into a spot on the photosensitive surface 6 by a scanning lens 5a. The light deflector 4 is rotated in the direction of the arrow A, thereby light scanning the photosensitive drum surface 6 at a constant speed in the direction of the arrow B (main scanning direction).

Thus, the image is recorded on the photosensitive drum surface 6 which is a recording medium.

The anamorphic condenser lens 2 in this embodiment is an anamorphic lens whose refractive power is larger in the sub-scanning cross section than in the main scanning cross section.

In addition, the anamorphic condenser lens 2 in this embodiment is provided with optical power in the main scanning direction and optical power in the sub-scanning direction.

The anamorphic condenser lens 2 has such a configuration that a collimator lens 92 and a cylindrical lens 94 according to the conventional optical scanning apparatus shown in FIG. 6 are integrally formed. As a result, it is possible to reduce the number of parts and to miniaturize and simplify (reduce the cost of) the whole apparatus.

When the anamorphic condenser lens 2 like this is used, the effects as mentioned above can be obtained.

However, depending on a method of adjusting a convergence degree (parallelism) (adjusting the collimator) of the light beam emitted from the anamorphic condenser lens 2, a spot on the surface 6 to be scanned may not be sufficiently converged.

Hereinafter, this phenomenon is explained with reference to (A), (B) and (C) of FIG. 3. (A) of FIG. 3 is the main scanning cross section of the optical system according to the first embodiment of the present invention.

If a distance between the light source means 1 such as the semiconductor laser and the anamorphic condenser lens 2 in the traveling direction of the light beam (optical axis direction of the incident optical system) is accurately set in accordance with a designed value, the light beam emitted from the light source means 1 is condensed into a spot by the scanning lens 5a on the surface 6 to be scanned configured by the photosensitive drum and the like.

However, in general, with regard to a position of a light emitting point of the light source means 1 such as the semiconductor laser, a positional error exists by necessity; and also in mounting the light source means 1 onto the optical scanning apparatus, a mounting error exists by necessity.

Therefore, it is necessary to accurately adjust the distance between the light emitting point of the light source means 1 and the anamorphic condenser lens 2 in the traveling direction of the light beam. Hereinafter, the adjustment is referred to as a collimator adjustment.

(B) of FIG. 3 is the main scanning cross sectional view showing a case where the light emitting point of the light source means 1 is mounted on the optical scanning apparatus with a deviation of a prescribed amount $\delta_X$ in a direction of an arrow E (traveling direction of the light beam) in (B) of FIG. 3.

In this case, in order to normally converge the light beam (imaging spot) on the surface 6 to be scanned in the main scanning cross section, it is obvious that the anamorphic condenser lens 2 must also be moved by the same prescribed amount $\delta_X$ (must be subjected to the collimator adjustment) in a direction of an arrow L in (B) of FIG. 3.

(C) of FIG. 3 shows the sub-scanning cross section of (B) of FIG. 3.

In (C) of FIG. 3, because the anamorphic condenser lens 2 is moved in the direction of the arrow L in (C) of FIG. 3 by $\delta_X$, a condensing point of the light beam to be converged on the deflecting surface 4a of the polygon mirror 4 in the sub-scanning cross section is deviated in a direction of an arrow S in (C) of FIG. 3 by $\delta_X$.

The condensing point in the sub-scanning cross section which is deviated by an amount of deviation $\delta_X$ cannot normally condense the light beam on the surface 6 to be scanned. Accordingly, the condensing point condenses the light beam with the deviation by the amount of deviation of $\delta_X \times \beta^2$ ($\beta$ is a lateral magnification of the scanning lens 5a in the sub-scanning cross section) in a direction of an arrow T in (C) of FIG. 3.

That is, when a condensing state on the surface 6 to be scanned in the main scanning cross section is excellently adjusted, the condensing state on the surface 6 to be scanned in the sub-scanning cross section is deteriorated. Therefore, it can be understood that it is difficult to excellently adjust the condensing state on the surface 6 to be scanned both in the main scanning cross section and in the sub-scanning cross section.

In other words, when the adjustment is carried out so that a beam waist is located on the surface 6 to be scanned by moving also the anamorphic condenser lens 2 in the main scanning cross section in the direction of the arrow L in (C) of FIG. 3 by the same prescribed amount $\delta_X$, there arises a problem in that the beam diameter of the imaging spot on the surface 6 to be scanned in the sub-scanning cross section is enlarged.

In the collimator adjustment mentioned above, because the diameter in the main scanning direction of the spot on the surface to be scanned in the image forming apparatus such as a laser beam printer or a digital copying machine is generally set smaller compared to the diameter in the sub-scanning direction, it is preferable to carry out the adjustment so as to make the spot diameter in the main scanning direction smaller.

Here, the condensing state of the spot in the sub-scanning direction in the case where the adjustment as mentioned above is carried out will be examined.

The well-known expression of Gaussian beam propagation of:

$$w2 = w_0^2 \{1 + (\lambda_0 \times x / \pi \times w_0^2)^2\} \quad (1)$$

is established, where $w_0$ represents the beam radius of the imaging spot condensed by the imaging optical system condensed on the surface 6 to be scanned at a beam waist position, w represents the beam radius at the position separated by a distance x from a position of the imaging spot condensed on the surface 6 to be scanned in the traveling direction of the light beam; and $\lambda_O$ (mm) represents a wavelength of the light beam emitted from the light source means.

Here, the "beam radius" is defined as a radius at which intensity distribution in the cross section of the beam becomes the intensity of $1/e^2$ of peak intensity as a Gaussian distribution.

When the expression (1) is transformed, an expression $$x^2 = \frac{\pi^2 w_0^2(w^2 - w_0^2)}{\lambda_0^2} \quad (2)$$

is obtained.

Here, the beam radius at the beam waist position of the imaging spot condensed by the imaging optical system condensed on the surface 6 to be scanned in the sub-scanning direction, may be allowed to at most 25% increased because an excellent print quality can be obtained. Therefore, the beam radius can be allowed up to 25% increased.

Therefore, when $w=1.25 w_0$ is substituted into the expression (2), an expression $$x = 2.356 \frac{w_0^2}{\lambda_0} \quad (3)$$

is obtained.

That is, $\delta_X \times \beta^2$ mentioned above may be $$x = 2.356 \frac{w_0^2}{\lambda_0}$$

or less, and it is necessary that $$\delta x \times \beta^2 \leq 2.356 \frac{w_0^2}{\lambda_0} \quad (4)$$

is established.

In addition, because in general, an error of about 0.1 (mm) in a positional accuracy of the light emitting point of the incident optical system 2 and incident optical system 3 of the light source means 1 such as the semiconductor laser exists, and because it is necessary to consider the error and the like in mounting the light source means 1 onto the optical scanning apparatus, it is necessary to consider that the positional error $\delta_X$ of the light emitting point of 0.1 (mm) or more exists.

Therefore, $$\beta^2 \leq 23.56 \times w_0^2/\lambda_0 \quad (5)$$

is derived from the expression (4), in situations where the positional error $\delta_X$ is assumed to be 0.1 (mm) or more.

In addition, if the lateral magnification $\beta$ of the imaging optical system 5 in the sub-scanning cross section is set to be 1 or less, the imaging optical system 5 gets closer to the surface 6 to be scanned and the imaging optical system 5 becomes large. Therefore, it becomes difficult to miniaturize and simplify (reduce the cost of) the whole apparatus.

Accordingly, in this embodiment, the lateral magnification $\beta$ of the imaging optical system 5 in the sub-scanning cross section is set to be 1 or more.

Therefore, it is preferable to set each value so that conditions of $$1 \leq \beta^2$$

$$\beta^2 \leq 23.56 \times w_0^2/\lambda_0 \quad (6)$$

are satisfied in situations where the positional error $\delta_X$ is assumed to be 0.1 (mm) or more That is, in a case where the anamorphic condenser lens 2 is used, when the lateral magnification of the imaging optical system 5 in the sub-scanning cross section is $\beta$, the beam radius of the imaging spot condensed by the imaging optical system 5 on the surface 6 to be scanned in the sub-scanning direction is w0, and the wavelength of the light beam emitted from the light source means 1 is $\lambda_O$ (mm), for situations where the positional deviation error $\delta_X$ is assumed to be 0.1 (mm) or more, is necessary to set each value so that the expression (6) is satisfied.

Thus, it is possible to effectively suppress the deterioration of the light beam condensed into the spot on the surface 6 to be scanned, thereby making it possible to provide the optical scanning apparatus in which a drawing performance is not deteriorated and the miniaturization and simplification of the whole apparatus are possible.

Characteristics of the optical system of the optical scanning apparatus according to the first embodiment of the present invention are shown in Table 1.

TABLE 1

| | | |
|---|---|---|
| Reference wavelength used | $\lambda$ (nm) | 780 |
| Distance from light emitting point to first surface of anamorphic condenser lens | d0 (mm) | 20.05000 |
| Thickness of anamorphic condenser lens | d1 (mm) | 3.00000 |
| Refractive index of anamorphic condenser lens | n1 | 1.51052 |
| Distance from anamorphic condenser lens to stop | d2 (mm) | 10.00000 |
| Distance from stop to deflecting and reflecting surface | d3 (mm) | 18.43000 |
| Distance from deflecting and reflecting surface to first surface of fθ lens | d4 (mm) | 27.00000 |
| Thickness of fθ lens | d5 (mm) | 8.60000 |
| Refractive index of fθ lens | n2 | 1.523972 |
| Distance from second surface of fθ lens to surface to be scanned | d6 (mm) | 103.49508 |
| Incident angle of incident optical system (in main scanning cross section) | $\gamma$ (degree) | 85.00000 |
| Maximum light scanning angle | $\zeta$ (degree) | ±48.60000 |
| Number of reflection surfaces of light deflection device | N | 4 |
| Radius of circumscribed circle of light deflector | $\Phi$ (mm) | 10.00000 |
| Shape of stop | ellipse | main scanning 2.54 mm × sub-scanning 1.18 mm |
| Radius of curvature of first surface of anamorphic condenser lens | r1 (mm) | ∞ |
| Radius of curvature of second surface of anamorphic condenser lens in main scanning direction | r2m (mm) | −10.53150 |
| Radius of curvature of second surface of anamorphic condenser lens in sub-scanning direction | r2s (mm) | −6.33800 |

TABLE 1-continued

| Shape of stop | | ellipse | | main scanning 2.54 mm × sub-scanning 1.18 mm |
|---|---|---|---|---|

| Shape of fθ lens | | | |
|---|---|---|---|
| First surface | | Second surface | |
| R | 43.77290 | R | 69.35640 |
| K | −5.16456E−01 | k | −1.38433E+00 |
| B2 | 1.77590E−01 | B2u | 2.24232E−04 |
| B4 | −1.55315E−05 | B4u | −1.08616E−05 |
| B6 | 1.24290E−08 | B6u | 6.06981E−09 |
| B8 | −5.77230E−12 | B8u | −1.33264E−12 |
| B10 | 9.56323E−16 | B10u | −1.70669E−16 |
| B12 | 0.00000E+00 | B12u | 3.37258E−21 |
| B14 | 0.00000E+00 | B14u | 1.81353E−24 |
| B16 | 0.00000E+00 | B16u | −3.65111E−28 |
| | | B21 | 2.24232E−04 |
| | | B41 | −1.07611E−05 |
| | | B61 | 5.99616E−09 |
| | | B81 | −1.32477E−12 |
| | | B101 | −1.33263E−16 |
| | | B121 | −2.80893E−20 |
| | | B141 | 1.22924E−23 |
| | | B161 | −1.31099E−27 |
| r | 9.31072 | r | 43.95712 |
| D2 | 1.60575E−03 | D2u | 4.74367E−07 |
| D4 | −2.27407E−06 | D4u | 7.22013E−10 |
| D6 | 2.39950E−09 | D6u | −1.91164E−10 |
| D8 | −1.45130E−12 | D8u | 7.5710E−14 |
| D10 | 3.24817E−16 | D10u | 9.71284E−19 |
| D12 | 0.00000E+00 | D12u | −5.24881E−22 |
| D14 | 0.00000E+00 | D14u | 0.00000E+00 |
| D16 | 0.00000E+00 | D16u | 0.00000E+00 |
| D21 | 1.87175E−03 | D21 | 9.92375E−07 |
| D41 | −3.12368E−06 | D41 | 7.09524E−10 |
| D61 | 3.91841E−09 | D61 | −3.01209E−11 |
| D81 | −2.47122E−12 | D81 | 8.05645E−14 |

An aspheric shape of the fθ lens 5a in the main scanning cross section is expressed in the expression of $$x = \frac{y^2/R}{1 + (1 - (1+k)(y/R)^2)^{1/2}} + \sum_{i=2}^{16} B_i y^i,$$

assuming that an intersection of each of lens surfaces and the optical axis is an origin point, the optical axis direction is an X-axis, an axis orthogonal to the optical axis in the main scanning cross section is a Y-axis, and an axis orthogonal to the optical axis in the sub-scanning cross section is a Z-axis.

Note that R is a radius of curvature; and k and $B_2$ through $B_{16}$ are aspherical coefficients.

Besides, the shape of the sub-scanning cross section is in a shape whose radius of curvature r' is expressed by the following expression when a coordinate of a lens surface in the main scanning direction is Y:

$$r' = r\left(1 + \sum_{j=2}^{16} D_j y^j\right).$$

Note that: r is the radius of curvature on the optical axis; and $D_2$ through $D_{16}$ are coefficients.

In FIG. 4, an aberration chart showing field curvatures of the optical system of the optical scanning apparatus according to the first embodiment of the present invention in the main scanning direction and in the sub-scanning direction.

In Table 2, the lateral magnification β of the imaging optical system in the optical scanning apparatus according to the first embodiment of the present invention in the sub-scanning cross section; the beam radius $w_0$ (beam radius having the intensity of $1/e^2$ of the peak intensity) at the beam waist position of the imaging spot condensed by the imaging optical system condensed on the surface 6 to be scanned in the sub-scanning direction; the wavelength $\lambda_0$ (mm) of the light beam emitted from the light source means 1; and each of the values of $\beta^2$ and $23.56 \times w_0^2/\lambda_0$ in the expression (6) are shown.

TABLE 2

| β | 4.3 | $\beta^2$ | 18.49 |
|---|---|---|---|
| $W_0$ | 0.03 | $23.56 \times W_0^2/\lambda_0$ | 26.84051 |
| $\lambda_0$ | 0.00079 | | |

As can be seen from Table 2, the lateral magnification β of the imaging optical system 5 of this embodiment in the sub-scanning cross section, the beam radius $w_0$ of the imaging spot condensed by the imaging optical system 5 on the surface 6 to be scanned in the sub-scanning direction, and the wavelength $\lambda_0$ of the light beam emitted from the light source means 1 are set to satisfy the conditional expression (6).

Thus, it is possible to effectively suppress the deterioration of the light beam condensed into the spot on the surface 6 to be scanned, thereby making it possible to provide the optical scanning apparatus in which a drawing performance is not deteriorated and the miniaturization and simplification of the whole apparatus are possible.

Note that the collimator adjustment mentioned above is carried out in a manner such that: the anamorphic condenser lens adjustment means 7 directly observes the imaging spot at a position equivalent to an actual position of the surface 6 to be scanned; and the anamorphic condenser lens 2 is moved in the optical axis direction so that the beam diameter of the imaging spot in the main scanning direction becomes minimum.

Because it is possible to adjust the deterioration of the spot diameter due to a manufacturing error of the scanning lens 5a by carrying out the collimator adjustment like this, it is possible to more excellently adjust the state of the imaging spot on the surface 6 to be scanned.

In addition, because there exists the positional error not only in the optical axis direction of the anamorphic condenser lens 2 but also in a direction inside a plane orthogonal to the optical axis by necessity, the error of the position of the light emitting point of the light source means 1 such as the semiconductor laser, in general, corresponds to the error of an imaging position of the spot on the surface 6 to be scanned in the direction orthogonal to the optical axis.

Because a deviation of the position of the image occurs when the positional error exists, it is necessary to adjust the error. Hereinafter, the adjustment is referred to as an irradiation position adjustment.

In this embodiment, the light source means 1 is directly mounted or indirectly mounted via a fixing member to a housing of the optical scanning apparatus, and is configured so as to freely move within the plane orthogonal to the optical axis of the anamorphic condenser lens 2.

In this embodiment, the irradiation position adjustment of the imaging spot on the surface 6 to be scanned is carried out by moving the light source means 1 within the plane orthogonal to the optical axis of the anamorphic condenser lens 2 by adjusting by the first adjustment means 8 so that the imaging spot is positioned at a normal position of the position equivalent to the position of the surface 6 to be scanned.

The irradiation position adjustment of the imaging spot on the surface 6 to be scanned means the adjustment of the imaging position in the main scanning direction and the imaging position in the sub-scanning direction.

Note that the irradiation position adjustment can also be carried out by moving the anamorphic condenser lens 2 within the plane orthogonal to the optical axes of the incident optical system 2 and incident optical system 3, however, in order to carry out the adjustment like this, it is necessary to move the anamorphic condenser lens 2 three-dimensionally by holding the anamorphic condenser lens 2 in the air.

However, in the adjustment like this, an error due to a rotation of the anamorphic condenser lens 2 around the optical axis is apt to occur.

Refractive powers of the anamorphic condenser lens 2 in the main scanning cross section and in the sub-scanning cross section differ from each other.

Therefore, if the error due to the rotation of the anamorphic condenser lens 2 around the optical axes of the incident optical system 2 and incident optical system 3 occurs, the imaging spot on the surface 6 to be scanned is rotated and has an X-shape. As a result, the desired spot diameter cannot be obtained and the image deterioration is easy to occur.

Accordingly, in this embodiment, the collimator adjustment is carried out by moving the anamorphic condenser lens 2 simply in the optical axis directions of the incident optical system 2 and incident optical system 3 as mentioned above, and the irradiation position adjustment is carried out by moving the light source means 1 within the plane orthogonal to the optical axis.

With this, it is possible to carry out a stable adjustment in which the image deterioration is unlikely to occur.

Note that in the conditional expression (6), the allowable value of the beam radius at the beam waist position of the imaging spot condensed by the imaging optical system on the surface 6 to be scanned in the sub-scanning direction is at most 25% increased value of the beam radius at the beam waist position of the imaging spot condensed by the imaging optical system condensed on the surface 6 to be scanned in the sub-scanning direction. However, in a case of a halftone such as a dot of a fine output image or a pulse width modulation (PWM), it is preferable that the allowable value of the beam radius at the beam waist position of the imaging spot in the sub-scanning direction be at most 20% increased value of the beam radius at the beam waist position of the imaging spot on the surface 6 to be scanned in the sub-scanning direction.

In this case, each value may be set so that conditions of:

$$1 \leq \beta^2$$

$$\beta^2 \leq 19.87 \times w_0^2 / \lambda_0 \quad (7)$$

are satisfied instead of the conditional expression (6), again, in situations where the positional error $\delta_X$ is assumed to be 0.1 (mm) or more.

Thus, as described above, this embodiment is devised in order to meet a demand for miniaturization and simplification of the optical scanning apparatus.

This embodiment is intended to miniaturize the optical scanning apparatus by simplifying the configuration of the optical scanning apparatus by configuring the collimator lens and the cylindrical lens in the conventional optical scanning apparatus by one single anamorphic condenser lens.

The anamorphic condenser lens described in this first embodiment is configured by an optical glass. However, it is possible to configure the anamorphic condenser lens by an optical plastic material, thereby making it possible to mold the anamorphic condenser lens with short molding tact and manufacture the anamorphic condenser lens easily.

In this embodiment, a novel adjustment (collimator adjustment) method of adjusting the convergence degree (parallelism) of the light beam emitted from the anamorphic condenser lens and a novel configuration with which it is possible to effectively suppress the deterioration of the light beam condensed into the spot on the surface to be scanned due to the error of an optical characteristic are employed, thereby obtaining a novel optical scanning apparatus in which a drawing performance is not deteriorated and the miniaturization and simplification of the whole apparatus are possible.

Second Embodiment

Next, a second embodiment of the present invention will be explained.

This embodiment differs from the first embodiment mentioned above in that this embodiment employs a configuration such that the anamorphic condenser lens 2 is positioned and fixed at a position of a desired design value on the housing of the optical scanning apparatus.

In addition, this embodiment differs from the first embodiment mentioned above in that: the light source means 1 is directly mounted or indirectly mounted via the fixing member to the housing of the optical scanning apparatus; and the collimator adjustment is carried out by moving the light source means 1 along the optical axis direction of the anamorphic condenser lens 2.

As explained referring to (A), (B) and (C) of FIG. 3, with regard to the position of the light emitting point of the light source means 1 such as a semiconductor, there exists the error $\delta_X$ of about 0.1 mm in the optical axis direction of the incident optical system.

Therefore, if the light beam is normally condensed on the surface 6 to be scanned in the main scanning cross section, it is not possible to normally condense the light beam in the sub-scanning cross section, resulting in that the condensing position is deviated by $\delta_X \times \beta^2$.

In the first embodiment, in order to prevent the light beam condensed into the spot from deteriorating even in the case like this, the setting is performed so that the lateral magnification $\beta$ of the imaging optical system 5 in the sub-scanning cross section, the beam radius $w_0$ of the imaging spot condensed by the imaging optical system 5 on the surface 6 to be scanned in the sub-scanning direction, and the wavelength $\lambda_0$ of the light beam emitted from the light source means 1 satisfy the conditional expression (6), in situations where the positional error $\delta_X$ is assumed to be 0.1 (mm) or more.

On the other hand, in the case where the anamorphic condenser lens 2 is positioned and fixed at the position of the desired design value on the housing of the optical scanning apparatus, a positional accuracy of the fixing position is usually 0.05 mm or less. Thus, it is possible to fix the anamorphic condenser lens 2 with the accuracy higher than the accuracy in the case of the position of the light emitting point of the light source means 1 mentioned above.

Accordingly, by positioning and fixing the anamorphic condenser lens 2 on the housing of the optical scanning apparatus at the position of the desired design value and moving the light source means 1 along the optical axis direction of the anamorphic condenser lens 2 in accordance with the position at which the anamorphic condenser lens 2 is thus fixed, the deviation $\delta_X \times \beta^2$ of the condensing position in the sub-scanning cross section can be small.

Note that in the collimator adjustment described above, the imaging spot is directly observed at the position equivalent to the actual position of the surface 6 to be scanned and the light source means 1 is moved in the optical axis direction so that the beam diameter of the imaging spot in the main scanning direction is made to be minimum.

However, in the collimator adjustment in this embodiment, the imaging spot may be directly observed at the position equivalent to the actual position of the surface 6 to be scanned and the light source means 1 may be moved in the optical axis direction so that the beam diameter of the imaging spot in the sub-scanning direction is made to be minimum.

Other configurations and optical effects are substantially the same as those of the first embodiment. Accordingly, the same effects as the effects of the first embodiment are obtained.

That is, in the first embodiment as described above, the collimator adjustment is carried out by moving the anamorphic condenser lens 2 in the optical axis direction.

In this case, each of the values such as the beam radius $w_0$ of the imaging spot condensed by the imaging optical system 5 in the sub-scanning direction and the wavelength $\lambda_0$ of the light beam emitted from the light source means 1 are set so as to satisfy the above-mentioned conditional expression (4), substituting a value of $\delta_X=0.05$ (mm) in place of $\delta_X=0.1$ (mm), together with the conditional limit on magnification $\beta$, namely, $1 \leq \beta^2$.

As a result, it is possible to effectively suppress the deterioration of the light beam condensed into the spot on the surface 6 to be scanned.

In addition, this embodiment has a configuration such that the anamorphic condenser lens 2 is positioned and fixed on the housing of the optical scanning apparatus at the position of the desired design value.

In other words, this embodiment employs the configuration such that: the light source means 1 is directly mounted or indirectly mounted via the fixing member on the housing of the optical scanning apparatus; and the collimator adjustment is carried out by moving the light source means 1 by a second adjustment means along the optical axis direction of the anamorphic condenser lens 2.

In this way, it can be readily understood that in this embodiment, with the configuration such that the light source means 1 itself is moved in the optical axis direction of the anamorphic condenser lens 2, such a phenomenon that both the condensing state in the main scanning cross section and the condensing state in the sub-scanning cross section cannot be excellently adjusted does not occur.

This is because there is no deviation $\delta_X$ of the condensing point of the light beam to be condensed on the deflecting surface 4a of the polygon mirror 4 if the anamorphic condenser lens 2 is accurately fixed at the position in accordance with the design value because the anamorphic condenser lens 2 is not moved in the optical axis direction of the anamorphic condenser lens 2. In addition, this is because the amount of deviation $\delta_X$ of the condensing point of the light beam to be condensed on the deflecting surface 4a of the polygon mirror 4 is smaller than in the case of the first embodiment because even when there occurs the error of the fixing point of the anamorphic condenser lens 2, the positional accuracy is higher than the positional accuracy of the light emitting point of the light source means 1.

Note that in this embodiment, it is preferable to carry out the irradiation position adjustment by adjusting the position of the light source means 1 in the plane orthogonal to the direction of the optical axes of the incident optical system 2 and the incident optical system 3 by the first adjustment means 8.

This is because it is possible to shorten the time of adjustment and simplify an adjustment process by simultaneously carrying out the positional adjustment of the direction of the optical axes of the incident optical system 2 and the incident optical system 3 and the position within the plane orthogonal to the direction of the optical axes of the incident optical system 2 and the incident optical system 3.

The irradiation position adjustment of the imaging spot on the surface 6 to be scanned means the imaging position in the main scanning direction and the imaging position in the sub-scanning direction.

In addition, in a case where a multi-beam semiconductor laser having a plurality of light emitting points (light emitting sections) as the light source means 1 is used, a pitch adjustment in the sub-scanning cross section on the surface 6 to be scanned may be carried out by rotating the light source means 1 around the optical axis.

With the configuration like this, it is possible to carry out all of the collimator adjustment, the irradiation position adjustment, and the adjustment of a pitch interval of the multi-beam only with the light source means 1, and a remarkable effect that it is possible to shorten the adjustment time and simplify the adjustment process can be obtained.

Note that the collimator adjustment may be carried out by relatively moving the anamorphic condenser lens 2 and the light source means 1 along the optical axis direction of the anamorphic condenser lens 2, not only by carrying out the adjustment as described in the first embodiment and the second embodiment mentioned above.

Third Embodiment

Next, a third embodiment of the present invention is explained.

In this embodiment, the points different from the first embodiment and the second embodiment mentioned above are that the anamorphic condenser lens 2 is molded with a plastic material and that a diffractive portion (diffractive optical element) in a diffraction grating structure is provided on at least one of the lens surfaces.

Other configurations and optical effects are substantially the same as those of the first embodiment and the second embodiment, and thereby the same effects as the effects of the first embodiment and the second embodiment are obtained.

Conventionally, for a collimator lens, the optical glass having superior environmental stability is used. This is because when the error occurs in the distance between the collimator lens and the light source means, the large deviation of the condensing position of the spot on the surface to be scanned in the optical axis direction since the focal length of the collimator lens is relatively short.

Because of this, the plastic material having a great fluctuation of refractive index depending on an environmental temperature is not in practical use.

In this embodiment, because the anamorphic condenser lens 2 is configured such that the collimator lens and the cylindrical lens are integrally formed, the shape of the anamorphic condenser lens 2 does not become rotationally symmetric with respect to the optical axis but becomes anamorphic shape, which is rotationally asymmetric with respect to the optical axis.

Because it is difficult to manufacture and the cost is expensive if the anamorphic condenser lens 2 of such a configuration is made of the optical glass, the anamorphic condenser lens 2 is formed with the plastic material and is manufactured by simple plastic molding in this embodiment.

However, because the plastic material has a great fluctuation of the refractive index depending on the environmental temperature, the focal length of the anamorphic condenser lens 2 is varied in accordance with the fluctuation of the refractive index.

In this regard, in this embodiment, a configuration is employed in which the focal length is not fluctuated even if the environmental temperature is varied, by forming the diffractive portion of the diffraction grating structure on at least one of the lens surfaces of the anamorphic condenser lens 2.

Hereinafter, the configuration of this embodiment is explained in detail.

In general, an optical power $\Phi$ of a thin lens is represented as $$\Phi = (n-1)C_0$$

where $C_0$ is a constant.

Here, in the same way, the optical power $\Phi_z^{diff}$ of the diffractive optical element at the wavelength $\lambda_z$ can be represented by $$\Phi_z^{diff} = (n_z^{eff} - 1)C_0 \qquad (8),$$

where $n_z^{eff}$ is an apparent refractive index at the wavelength $\lambda_z$ of the diffractive optical element. The apparent refractive index is the refractive index in a case where the optical power $\Phi_z^{diff}$ which the diffractive optical element has at the wavelength $\lambda_z$ is tentatively dealt and represented as a refractive system.

An expression (5) is represented by $$n_z^{diff} = 1 + \frac{\phi_z^{diff}}{C_0}. \qquad (9)$$

In addition, because the optical power of the diffractive optical element is in proportion to the wavelength to be used, the optical power $\Phi_d^{diff}$ of a line d at the wavelength $\lambda_d$, for example, is represented by $$\phi_d^{diff} = \frac{\lambda_d}{\lambda_z}\phi_z^{diff}$$

by using the optical power $\Phi_z^{diff}$ mentioned above.

In the same way, an optical power $\Phi_F^{diff}$ and an optical power $\Phi_C^{diff}$ of the diffractive optical element of a line F and a line C at a wavelength $\lambda_F$ and a wavelength $\lambda_C$ are represented by $$\phi_F^{diff} = \frac{\lambda_F}{\lambda_z}\phi_z^{diff}, \quad \phi_C^{diff} = \frac{\lambda_C}{\lambda_z}\phi_z^{diff}.$$

Therefore, the apparent refractive indices $n_d^{eff}$, $n_F^{eff}$, and $n_C^{eff}$ of the diffractive optical element at the wavelengths $\lambda_d$, $\lambda_F$, and $\lambda_C$ are represented by $$n_d^{eff} = 1 + \frac{\phi_d^{diff}}{C_0} = 1 + \frac{\lambda_d \phi_z^{diff}}{C_0 \lambda_z}$$

-continued $$n_F^{eff} = 1 + \frac{\phi_F^{diff}}{C_0} = 1 + \frac{\lambda_F \phi_z^{diff}}{C_0 \lambda_z}$$

$$n_C^{eff} = 1 + \frac{\phi_C^{diff}}{C_0} = 1 + \frac{\lambda_C \phi_z^{diff}}{C_0 \lambda_z}.$$

Here, an apparent variance $v_d^{diff}$ of a diffraction system can be defined just as a definition of a variance $v_d$ in the refractive system, and can be represented by $$v_d^{diff} = \frac{n_d^{eff} - 1}{n_F^{eff} - n_C^{eff}} = \frac{\left(1 + \frac{\lambda_d \phi_z^{eff}}{C_0 \lambda_z}\right) - 1}{\left(1 + \frac{\lambda_F \phi_z^{diff}}{C_0 \lambda_z}\right) - \left(1 + \frac{\lambda_C \phi_z^{diff}}{C_0 \lambda_z}\right)} = \frac{\lambda_d}{\lambda_F - \lambda_C}. \qquad (10)$$

Therefore, just as the anamorphic condenser lens 2 in the optical scanning apparatus of this embodiment, an achromatic condition in a case where the diffractive optical element is added to the lens of the normal refractive system is to satisfy the expression of:

$$\frac{\phi_d^{refr}}{v_d^{refr}} + \frac{\phi_d^{diff}}{v_d^{diff}} = 0, \qquad (11)$$

where $V_d^{refr}$ represents the dispersion of the refractive portion, $\Phi_d^{refr}$ represents the optical power of the refractive portion, $v_d^{diff}$ represents the optical power of the diffractive portion mentioned above, and $\Phi_d^{diff}$ represents the optical power of the diffractive portion.

By satisfying the expression (11) described above, it is possible to offset an optical power fluctuation caused by wavelength dependence of the refractive index of the material of the anamorphic condenser lens 2 with the optical power fluctuation of the diffractive optical element.

On the other hand, the refractive index of the plastic material of the anamorphic condenser lens 2 is varied also by the fluctuation of the environmental temperature.

More specifically, the refractive index of the semiconductor laser of the light source means 1 at the standard environmental temperature of 25° C. of the plastic material used in this embodiment at a center oscillating wavelength of $\lambda_0$=790 nm $n_{\lambda 0}$ is as follows:

$$n_{\lambda 0} = 1.523972.$$

On the other hand, the refractive index $n_{\lambda 0}^{50° C.}$ in a case where the environmental temperature is raised by 25° C. to be at 50° C. due to rise of the temperature in the inside of the apparatus or the like at the wavelength of $\lambda_0$=790 nm becomes $n_{\lambda 0}^{50° C.}$=1.521852. That is, the refractive index is decreased by 0.00212.

In addition, in a case just after the time when the apparatus is started up for the first time of a day in the morning in a cold district, it is necessary to assume that the environmental temperature is at about 5° C. The refractive index at the environmental temperature of 5° C. at the wavelength of $\lambda_0$=790 nm is $n_{\lambda 0}^{5° C.}$=1.525668. That is, the refractive index is increased by 0.001696.

Here, the semiconductor laser which is the light source means 1 used for the optical scanning apparatus of this embodiment generally has a characteristic such that an oscillating wavelength of the semiconductor laser is shifted to the side of a longer wavelength because a band gap becomes small when the temperature is raised. More specifically, the semiconductor laser used for the optical scanning apparatus of this embodiment has a characteristic such that the wavelength is shifted to the longer wavelength side with a ratio of 0.255 mm/° C.

In other words, the semiconductor laser used for the optical scanning apparatus of this embodiment is oscillated at the wavelength of $\lambda_0$=790 nm at the environmental temperature of 25° C.; at the wavelength of $\lambda_0^{50°C.}$=796.375 nm at the environmental temperature of 50° C.; and at wavelength of $\lambda_0^{5°C.}$=784.9 nm at the environmental temperature of 5° C. Therefore, the accurate refractive index of the plastic material when the environmental temperature is at 50° C. is the value lower than the refractive index of the plastic material 1.523830 at the oscillation wavelength of $\lambda_0^{50°C.}$=796.375 nm by 0.00212, that is, $n_{\lambda_0}^{50°C.}$=1.521710. In the same way, the accurate refractive index of the plastic material when the environmental temperature is at 5° C. is the value higher than the refractive index of the plastic material 1.524087 at the oscillation wavelength of $\lambda_0^{5°C.}$=784.9 nm by 0.001696, that is, $n_{\lambda_0}^{5°C.}$=1.525783.

To assume the fluctuation of the refractive index of the plastic material due to the fluctuation of the environmental temperature as the "dispersion of the environmental temperature dependency", the dispersion $v_t^{refr}$ of the environmental temperature dependency is $$v_t^{refr} = \frac{n_{\lambda_0}-1}{n_{\lambda_0}^{5°C.}-n_{\lambda_0}^{50°C.}} = \frac{1.523972-1}{1.525783-1.521710} = 128.6452247.$$

Besides, the dispersion $v_t^{diff}$ in a wavelength range corresponding to the range of the environmental temperature of 5° C. to 50° C. of the diffractive optical element portion of the anamorphic condenser lens 2 is $$v_t^{diff} = \frac{\lambda_0}{\lambda_0^{5°C.}-\lambda_0^{50°C.}} = \frac{790}{784.9-796.375} = -68.8453159$$

Here, the achromatic condition in the environmental temperature range, can be expressed as $$\frac{\phi_{\lambda_0}^{refr}}{v_t^{refr}} + \frac{\phi_{\lambda_0}^{diff}}{v_t^{diff}} = \frac{\phi_{\lambda_0}^{refr}}{128.6452247} + \frac{\phi_{\lambda_0}^{diff}}{-68.8453159} = 0, \quad (12)$$

where $\Phi_{\lambda_0}^{refr}$ represents the optical power of the refractive portion and $\Phi_{\lambda_0}^{diff}$ represents the optical power of the diffractive portion at the environmental temperature of 25° C. at the center oscillating wavelength of $\lambda_0$=790 nm of the anamorphic condenser lens 2. That is, the optical power $\Phi_{\lambda_0}^{refr}$ of the refractive portion may be set to be substantially 1.87 times of the optical power $\Phi_{\lambda_0}^{diff}$ of the diffractive portion.

The expression (12) expresses the condition for offsetting the optical power fluctuation of the refractive portion due to the temperature dependence characteristic of the refractive index of the plastic material with the optical power fluctuation of the diffractive optical element due to the temperature dependence characteristic of the oscillating wavelength of the semiconductor laser.

In this embodiment, the diffractive portion in the diffraction grating structure which satisfies the expression (12) in the main scanning cross section and the sub-scanning cross section is added to at least one of the anamorphic condenser lenses 2.

Thereby it is possible to use the plastic material which is not conventionally used and to manufacture the apparatus by the simple plastic molding.

Note that the expression (12) is strictly established in the case of the temperature dependence characteristic of the refractive index of the plastic material used in this embodiment and the temperature dependence characteristic of the oscillating wavelength of the semiconductor laser used in this embodiment.

In this case, even if the environmental temperature is varied, the focal length (optical power) of the anamorphic condenser lens 2 is not varied at all both in the main scanning cross section and in the sub-scanning cross section.

However, in actuality, it is not necessary to completely offset the variance of the focal length (optical power fluctuation) by strictly satisfying the expression (12) and the effect of this embodiment can be exerted enough just by configuring the apparatus so that the variance of the focal length is corrected to a certain degree.

In this regard, considering the temperature characteristic of the plastic material and the semiconductor laser which can be used for practical optical use, and assuming that the effect of this embodiment can be obtained by correcting about half of the optical power fluctuation of the refractive portion due to the temperature dependence characteristic of the refractive index of the plastic material with the optical power fluctuation of the diffractive portion, the following conditions $$1.437 \leq \Phi^{refr}_M/\Phi^{diff}_M \leq 2.669 \ (13); \text{ and}$$

$$1.437 \leq \Phi^{refr}_S/\Phi^{diff}_S \leq 2.669 \ (14)$$

are satisfied, where the optical power of the refractive portion in the main scanning direction is $\Phi^{refr}_M$, the optical power of the diffractive portion in the main scanning direction is $\Phi^{diff}_M$, the optical power of the refractive portion in the sub-scanning direction $\Phi^{refr}_S$, the optical power of the diffractive portion in the sub-scanning direction is $\Phi^{diff}_S$.

It is further preferable that the conditional expression (13) and the conditional expression (14) are set as follows:

$$1.557 \leq \frac{\phi_M^{refr}}{\phi_M^{diff}} \leq 2.336; \quad (13a)$$

and $$1.557 \leq \frac{\phi_S^{refr}}{\phi_S^{diff}} \leq 2.336. \quad (14a)$$

Note that as can be understood from the conditional expression (13) and the conditional expression (14) mentioned above, all of the optical power by the refraction in the main scanning cross section, the optical power by the diffraction in the main scanning cross section, the optical power by the refraction in the sub-scanning cross section, and the optical power by the diffraction in the sub-scanning cross section of the anamorphic condenser lens 2 are positive.

In the optical scanning apparatus in this embodiment, the conditional expression (13) and the conditional expression (14) are satisfied. As a result, it is possible to correct the optical power fluctuation in the refractive portion of the anamorphic condenser lens 2 caused by the environmental temperature fluctuation with the optical power fluctuation in the diffractive portion, and accordingly, it is possible to effectively suppress the fluctuation of the spot diameter of the spot on the surface 6 to be scanned.

Table 3 shows the data of the anamorphic condenser lens 2 of the optical scanning apparatus according to the third embodiment of the present invention.

TABLE 3

| Surface number | Rm | Rs | d | N (25° C., 790 nm) | n (5° C., 784.9 nm) | N (50° C., 796.375 nm) |
|---|---|---|---|---|---|---|
| 0 | | | 20.05 | 1 | 1 | 1 |
| *1 | ∞ | ∞ | 3 | 1.523972 | 1.525783 | 1.521710 |
| 2 | −16.33548 | −9.81199 | 1 | 1 | 1 | 1 |

Note that in Table 3, a surface number 0 denotes the light emitting point of the light source means 1 and the mark "*" which is placed on the left of the surface number indicates the surface on which the diffractive optical element is added. In the optical scanning apparatus of this embodiment, the diffractive optical element is added to the surface (surface number 1) at the side of the light source (incident side) of the anamorphic condenser lens 2.

A phase function Φ of the diffractive optical element is rotationally asymmetric with respect to the optical axis of the anamorphic condenser lens 2, and is represented as polynominal expressions as mentioned below of:

$$\phi(y) = \frac{2\pi m}{\lambda_0} + \sum_{i=1}^{n} c_i y^i; \quad (15)$$

and $$\phi(z) = \frac{2\pi m}{\lambda_0} + \sum_{i=1}^{n} d_i z^i \quad (16)$$

in an orthogonal coordinate system in which the optical axis direction is the X-axis. Here, the expression (15) represents the phase function in the main scanning cross section and the expression (16) represents the phase function in the sub-scanning cross section.

In addition, here, $\lambda_0$ is a reference wavelength, which is 790 (nm) in this embodiment; and m is a diffraction order, and a first diffraction order is used in this embodiment.

The phase functions Φ(y) and Φ(z) of the diffractive optical element of the anamorphic condenser lens 2 in the optical scanning apparatus of this embodiment use quadratic coefficients of the polynominal expression only, and the coefficients $c_2$ and $d_2$ are represented in the expressions of:

$$c_2 = -9.566182 \times 10^{-3}$$

$$d_2 = -1.548503 \times 10^{-2}.$$

In Table 4, the optical power $\Phi^{refr}_M$ in the main scanning direction of the refractive portion of the anamorphic condenser lens 2 in the optical scanning apparatus of the present invention, the optical power $\Phi^{diff}_M$ in the main scanning direction of the diffractive portion of the anamorphic condenser lens 2, the optical power $\Phi^{refr}_S$ in the sub-scanning direction of the refractive portion of the anamorphic condenser lens 2, the optical power $\Phi^{diff}_S$ in the sub-scanning direction of the diffractive portion of the anamorphic condenser lens 2, and each value of the conditional expression (13) and the conditional expression (14) are shown.

TABLE 4

| $\Phi^{refr}_S$ | 0.05340 | $\Phi^{refr}_M$ | 0.03208 |
|---|---|---|---|
| $\Phi^{diff}_S$ | 0.03097 | $\Phi^{diff}_M$ | 0.01913 |
| $\Phi^{refr}_S / \Phi^{diff}_S$ | 1.724284 | $\Phi^{refr}_M / \Phi^{diff}_M$ | 1.676515 |

As can be understood from Table 4, in this embodiment, both of the conditional expression (13) and conditional expression (14) are satisfied.

As a result, it is possible to correct the optical power fluctuation of the refractive portion of the anamorphic condenser lens 2 caused by the environmental temperature fluctuation with the optical power fluctuation of the diffractive portion. In addition, it is possible to effectively suppress the fluctuation of the beam diameter in the sub-scanning direction of the imaging spot on the surface 6 to be scanned.

Further, it is possible to achieve the novel optical scanning apparatus in which the drawing performance is not deteriorated and the miniaturization and simplification of the whole apparatus are possible.

In the optical scanning apparatus of this embodiment, the diffractive optical element is added on the surface (surface number 1) on the side of the light source (incident side) of the anamorphic condenser lens 2. However, it is also possible to effectively suppress the fluctuation of the beam diameter in the sub-scanning direction of the imaging spot on the surface 6 to be scanned caused by the environmental temperature fluctuation even if the diffractive optical element is added on the surface (surface number 2) on the side of the polygon mirror (emitting side) of the anamorphic condenser lens 2.

Note that in each of the embodiments, the imaging optical system is configured with one lens, however, the configuration is not restricted to this. That is, the imaging optical system may be configured with two or more lenses, for example.

In addition, the imaging optical system 5 may include not only the lens, but also a curved mirror.

The problem to be solved by the present invention becomes remarkably problematic in a case of a high resolution of 1,200 dpi or higher. Therefore, a more remarkable effect can be obtained when the configuration of the present invention is applied to the image forming apparatus having the resolution of 1,200 dpi or higher.

The number of light emitting portion of the light source means 1 of the present invention is not limited to one. The light source means 1 may be a multi-beam light source means having two or more light emitting portions.

<Image Forming Apparatus>

FIG. 5 is a main portion cross section in the sub-scanning cross section showing an embodiment of the image forming apparatus of the present invention. In FIG. 5, reference numeral 104 denotes the image forming apparatus.

In the image forming apparatus 104, code data Dc is inputted from an external device 117 such as a personal computer. The code data Dc is converted into image data (dot data) Di by a printer controller 111 in the image forming apparatus.

The image data Di is inputted to an optical scanning means 100 having the configuration as shown in any one of the first embodiment, the second embodiment, and the third embodiment.

In addition, a light beam 103 modulated in accordance with the image data Di is emitted from the optical scanning means 100, and a photosensitive surface of a photosensitive drum 101 is scanned in the main scanning cross section with the light beam 103.

The photosensitive drum 101 which is an electrostatic latent image bearing member (photosensitive member) is rotated clockwise by a motor 115.

In accordance with the rotation, the photosensitive surface of the photosensitive drum 101 is moved into the sub-scanning cross section orthogonal to the main scanning cross section with respect to the light beam 103.

Above the photosensitive drum 101, a charging roller 102 for evenly charging the surface of the photosensitive drum 101 is mounted so as to abut the surface of the photosensitive drum 101.

In addition, the light beam 103 with which the optical scanning means 100 scans is irradiated on the surface of the photosensitive drum 101 charged by the charging roller 102.

As is explained above, the light beam 103 is modulated on the basis of the image data Di, and an electrostatic latent image is formed on the surface of the photosensitive drum 101 by irradiating the light beam 103.

The electrostatic latent image is developed as a toner image by a developing device 107 disposed so as to abut the photosensitive drum 101 at a further downstream side of an irradiation position of the light beam 103 in the rotation direction of the photosensitive drum 101.

The toner image developed by the developing device 107 is transferred on a paper sheet 112 which is a transfer material below the photosensitive drum 101 by a transferring roller 108 disposed so as to oppose to the photosensitive drum 101.

The paper sheet 112 is stored in a paper cassette 109 at the front of the photosensitive drum 101 (on the right side in FIG. 5), however, it is also possible to manually feed the paper sheet. At an edge portion of the paper cassette 109, a sheet feed roller 110 is disposed. The sheet feed roller 110 feeds the paper sheet 112 in the paper cassette 109 into a conveyance path.

In the manner as described above, the paper sheet 112 on which an unfixed toner image is transferred is further conveyed to a fixing device at the back of the photosensitive drum 101 (on the left side in FIG. 5).

The fixing device is configured by a fixing roller 113 having a fixing heater (not shown) in the inside thereof and a pressure roller 114 disposed so as to come into pressure contact with the fixing roller 113.

The unfixed toner image on the paper sheet 112 is fixed by applying pressure and heat to the paper sheet 112 conveyed from a transferring portion at a pressure contact portion of the fixing roller 113 and the pressure roller 114.

Further, at the back of the fixing roller 113, a delivery roller 116 is disposed. The delivery roller 116 delivers the paper sheet 112 on which the image is fixed to the outside of the image forming apparatus.

Although not shown in FIG. 5, the print controller 111 carries out a control of each portion of the image forming apparatus such as the motor 115 and a polygon motor in the optical scanning means described below, as well as conversion of the data explained above.

<Color Image Forming Apparatus>

FIG. 6 is a schematic diagram of a main portion of a color image forming apparatus of the embodiment of the present invention. This embodiment is a tandem type color image forming apparatus in which four optical scanning apparatuses are disposed side by side and recording of image information is collaterally carried out by the four optical scanning apparatuses on the surface of the photosensitive drum which is an image bearing member.

In FIG. 6, reference numeral 60 denotes the color image forming apparatus, reference numerals 11, 12, 13, and 14 respectively denote the optical scanning apparatus having any one of the configuration as shown in the first embodiment, the second embodiment and the third embodiment, reference numerals 21, 22, 23, and 24 respectively denote the photosensitive drum which is the image bearing member, reference numerals 31, 32, 33, and 34 respectively denote the developing device, and reference numeral 51 denotes a conveyor belt.

In FIG. 6, a color signal of each of R (red), G (green) and B (blue) is inputted to the color image forming apparatus 60 from the external device 52 such as a personal computer.

The color signals are converted into each image data (dot data) of C (cyan), M (magenta), Y (yellow), and K (black) by a printer controller 53 in the color image forming apparatus 60.

Each image data is respectively inputted to the optical scanning apparatuses 11, 12, 13, and 14.

Besides, light beams 41, 42, 43, and 44 modulated in accordance with each image data are emitted from those optical scanning apparatuses, and the photosensitive surfaces of the photosensitive drums 21, 22, 23, and 24 are scanned in the main scanning cross section by the light beams 41, 42, 43, and 44.

In the color image forming apparatus in this embodiment, four optical scanning apparatuses (11, 12, 13, and 14) are disposed and each correspond to the colors of C (cyan), M (magenta), Y (yellow), and K (black), respectively. Each of the optical scanning apparatuses (11, 12, 13, and 14) collaterally records the image signal (image information) on the surfaces of the photosensitive drums 21, 22, 23, and 24 to print the color image at a high speed.

As described above, in the color image forming apparatus of this embodiment, the latent image of each color is formed on the surfaces of the photosensitive drums 21, 22, 23, and 24 corresponding to each color by using the light beam based on each image data by means of the four optical scanning apparatuses 11, 12, 13, and 14.

After that, one full-color image is formed by multiple transfer of the image on a recording material.

As the external device 52, for example, a color image reading apparatus having a CCD sensor may be used. In this case, a color digital copying machine is configured by the color image reading apparatus and the color image forming apparatus 60.

This application claims priority from Japanese Patent Application No. 2004-313341 filed Oct. 28, 2004, which is hereby incorporated by reference herein.

What is claimed is:

1. An optical scanning apparatus, comprising:
   a light source means;
   an incident optical system for guiding a light beam emitted from the light source means to a deflecting means; and
   an imaging optical system for guiding the light beam reflected by the deflecting means onto a surface to be scanned,
   in which a deflecting surface of the deflecting means and the surface to be scanned satisfies a conjugate relation in a sub-scanning cross section,
   wherein the incident optical system comprises an anamorphic condenser lens having an optical power in a main scanning direction and an optical power in a sub-scanning direction, the optical power in the main direction and the optical power in the sub-scanning direction being different from each other;
   wherein a material of the anamorphic condenser lens is a plastic material, and wherein the anamorphic condenser lens comprises a diffractive portion having an optical power on at least one surface, wherein both the optical power in the main scanning direction of a refractive portion of the anamorphic condenser lens and the optical power in the sub-scanning direction of the refractive portion of the anamorphic condenser lens have a positive optical power;

wherein both the optical power in the main scanning direction of a diffractive portion of the anamorphic condenser lens and the optical power in the sub-scanning direction of the diffractive portion of the anamorphic condenser lens have a positive optical power; and wherein the following conditions are satisfied:

$$1.437 \leq \Phi^{refr}_M / \Phi^{diff}_M \leq 2.669$$

$$1.437 \leq \Phi^{refr}_S / \Phi^{diff}_S \leq 2.669,$$

where $\Phi^{refr}_M$ represents the optical power in the main scanning cross section of the refractive portion, $\Phi^{diff}_M$ represents the optical power in the main scanning cross section of the diffractive portion, $\Phi^{refr}_S$ represents the optical power of the refractive portion in the sub-scanning cross section, and $\Phi^{diff}_S$ represents the optical power in the sub-scanning cross section of the diffractive portion, and wherein the imaging optical system satisfies the following conditions:

$$1 \leq \beta^2; \text{ and}$$

$$\delta_{X \times \beta}^2 \leq 2.356 w_0^2 / \lambda_0; \text{ and}$$

$$\delta_X \geq 0.1 \text{ mm}$$

where $\beta$ represents a lateral magnification in the sub-scanning direction of the imaging optical system, $w_0$ represents a beam radius in the sub-scanning direction in a beam waist position of an imaging spot condensed by the imaging optical system, and $\lambda_0$ (mm) represents a wavelength of the light beam emitted from the light source means, and $\delta_X$ (mm) represents an error of a position of an optical axis direction of emission of light point of light source means.

2. An optical scanning apparatus according to claim 1, further comprising a first adjustment means for adjusting a beam diameter in the main scanning direction of the imaging spot on the surface to be scanned by moving the anamorphic condenser lens along a direction of an optical axis of the anamorphic condenser lens.

3. An optical scanning apparatus according to claim 2, wherein the first adjustment means is means for carrying out an adjustment by directly observing the beam diameter in the main scanning direction of the imaging spot on the surface to be scanned.

4. An optical scanning apparatus according to claim 2, wherein the first adjustment means is means for carrying out an adjustment so that the beam diameter in the main scanning direction of the imaging spot on the surface to be scanned becomes minimum.

5. An optical scanning apparatus according to claim 1, further comprising a second adjustment means for adjusting a condensing position of the imaging spot on the surface to be scanned by moving the light source means within a plane orthogonal to an optical axis of the anamorphic condenser lens.

6. An image forming apparatus, comprising:
   the optical scanning apparatus according to claim 1;
   a photosensitive member disposed on the surface to be scanned;
   a developing device for developing an electrostatic latent image formed on the photosensitive member by the light beam scanned by the optical scanning apparatus as a toner image;
   a transferring device for transferring the developed toner image on a transfer material; and
   a fixing device for fixing the transferred toner image on the transfer material.

7. An image forming apparatus, comprising:
   the optical scanning apparatus according to claim 6; and
   a printer controller for converting code data inputted from an external device into an image signal and inputting the image signal into the optical scanning apparatus.

8. A method for adjusting an optical scanning apparatus which includes: a light source means; an incident optical system for guiding a light beam emitted from the light source means to a deflecting means; and an imaging optical system for guiding the light beam reflected by the deflecting means onto a surface to be scanned, and in which a deflecting surface of the deflecting means and the surface to be scanned satisfies a conjugate relation in a sub-scanning cross section, wherein the incident optical system has an anamorphic condenser lens having an optical power in a main scanning direction and an optical power in a sub-scanning direction, the optical power in the main scanning direction and the optical power in the sub-scanning direction being different from each other;

wherein the method for adjusting an optical scanning apparatus comprises adjusting a beam diameter in the main scanning direction of the imaging spot on the surface to be scanned by moving the light source means along a direction of an optical axis of the anamorphic condenser lens, wherein a material of the anamorphic condenser lens is a plastic material;

wherein the anamorphic condenser lens comprises a diffractive portion having an optical power on at least one surface;

wherein both the optical power in the main scanning direction of a refractive portion of the anamorphic condenser lens and the optical power in the sub-scanning direction of the refractive portion of the anamorphic condenser lens have a positive optical power;

wherein both the optical power in the main scanning direction of a diffractive portion of the anamorphic condenser lens and the optical power in the sub-scanning direction of the diffractive portion of the anamorphic condenser lens have a positive optical power; and the following conditions are satisfied:

$$1.437 \leq \Phi^{refr}_M / \Phi^{diff}_M \leq 2.669$$

$$1.437 \leq \Phi^{refr}_S / \Phi^{diff}_S \leq 2.669,$$

where $\Phi^{refr}_M$ represents the optical power in the main scanning cross section of the refractive portion, $\Phi^{diff}_M$ represents the optical power in the main scanning cross section of the diffractive portion, $\Phi^{refr}_S$ represents the optical power in the sub-scanning cross section of the refractive portion, and $\Phi^{diff}_S$ represents the optical power in the sub-scanning cross section of the diffractive portion.

9. A method for adjusting an optical scanning apparatus according to claim 8, wherein the light source means is moved along the optical axis direction of the anamorphic condenser lens while directly observing the beam diameter in the main scanning direction of the imaging spot on the surface to be scanned.

10. A method for adjusting an optical scanning apparatus according to claim 8, wherein the light source means is moved along the optical axis direction of the anamorphic condenser lens so that the beam diameter in the main scanning direction of the imaging spot on the surface to be scanned becomes minimum.

11. A method for adjusting an optical scanning apparatus which has: a light source means; an incident optical system for guiding a light beam emitted from the light source means to a deflecting means; an imaging optical system for guiding the light beam reflected by the deflecting means onto a surface to be scanned, and in which a deflecting surface of the deflecting means and the surface to be scanned satisfies a conjugate relation in a sub-scanning cross section, wherein:

the incident optical system comprises an anamorphic condenser lens having an optical power in a main scanning direction and an optical power in a sub-scanning direction, the optical power in the main scanning direction and the optical power in the sub-scanning direction being different from each other;

the imaging optical system satisfies the following conditions:

$$1 \leq \beta^2;$$

$$\delta_X \times \beta^2 \leq 2.356 w_0^2/\lambda_0; \text{ and}$$

$$\delta_X \geq 0.1 \text{ mm}$$

where $\beta$ represents a lateral magnification of the imaging optical system in the sub-scanning direction, $w_0$ represents a beam radius in a beam waist position of an imaging spot condensed by the imaging optical system in the sub-scanning direction, and $\lambda_0$ (mm) represents a wavelength of the light beam emitted from the light source means, and $\delta_X$ (mm) represents an error of a position of an optical axis direction of emission of light point of light source means;

the method for adjusting an optical scanning apparatus comprises adjusting a beam diameter in the main scanning direction of the imaging spot on the surface to be scanned by moving the anamorphic condenser lens along a direction of an optical axis of the anamorphic condenser lens, wherein a material of the anamorphic condenser lens is a plastic material;

wherein the anamorphic condenser lens comprises a diffractive portion having an optical power on at least one surface;

wherein both the optical power in the main scanning direction of a refractive portion of the anamorphic condenser lens and the optical power in the sub-scanning direction of the refractive portion of the anamorphic condenser lens have a positive optical power;

wherein both the optical power in the main scanning direction of a diffractive portion of the anamorphic condenser lens and the optical power in the sub-scanning direction of the diffractive portion of the anamorphic condenser lens have a positive optical power; and the following conditions are satisfied:

$$1.437 \leq \Phi^{refr}_M/\Phi^{diff}_M \leq 2.669$$

$$1.437 \leq \Phi^{refr}_S/\Phi^{diff}_S \leq 2.669,$$

where $\Phi^{refr}_M$ represents the optical power in the main scanning cross section of the refractive portion, $\Phi^{diff}_M$ represents the optical power in the main scanning cross section of the diffractive portion, $\Phi^{refr}_S$ represents the optical power in the sub-scanning cross section of the refractive portion, and $\Phi^{diff}_S$ represents the optical power in the sub-scanning cross section of the diffractive portion.

12. An optical scanning apparatus, comprising:
a light source means;
an incident optical system for guiding a light beam emitted from the light source means to a deflecting means; and
an imaging optical system for guiding the light beam reflected by the deflecting means onto a surface to be scanned,
in which a deflecting surface of the deflecting means and the surface to be scanned satisfies a conjugate relation in a sub-scanning cross section,
wherein the incident optical system comprises:
an anamorphic condenser lens having an optical power in a main scanning direction and an optical power in a sub-scanning direction, the optical power in the main scanning direction and the optical power in the sub-scanning direction being different from each other; and
means for adjusting a beam diameter in the main scanning direction of the imaging spot on the surface to be scanned by moving the light source means along a direction of an optical axis of the anamorphic condenser lens,
wherein a material of the anamorphic condenser lens is a plastic material;
wherein the anamorphic condenser lens comprises a diffractive portion having an optical power on at least one surface;
wherein both the optical power in the main scanning direction of a refractive portion of the anamorphic condenser lens and the optical power in the sub scanning direction of the refractive portion of the anamorphic condenser lens have a positive optical power;
wherein both the optical power in the main scanning direction of a diffractive portion of the anamorphic condenser lens and the optical power in the sub scanning direction of the diffractive portion of the anamorphic condenser lens have a positive optical power; and
the following conditions are satisfied:

$$1.437 \leq \Phi^{refr}_M/\Phi^{diff}_M \leq 2.669$$

$$1.437 \leq \Phi^{refr}_S/\Phi^{diff}_S \leq 2.669,$$

where $\Phi^{refr}_M$ represents the optical power in the main scanning cross section of the refractive portion, $\Phi^{refr}_M$ represents the optical power in the main scanning cross section of the diffractive portion, $\Phi^{refr}_S$ represents the optical power in the sub scanning cross section of the refractive portion, and $\Phi^{diff}_S$ represents the optical power in the sub scanning cross section of the diffractive portion.

13. An image forming apparatus, comprising: the optical scanning apparatus according to claim 12;
a photosensitive member disposed on the surface to be scanned;
a developing device for developing an electrostatic latent image formed on the photosensitive member by the light beam scanned by the optical scanning apparatus as a toner image;
a transferring device for transferring the developed toner image on a transfer material; and
a fixing device for fixing the transferred toner image on the transfer material.

14. An image forming apparatus, comprising:
the optical scanning apparatus according to claim 13; and
a printer controller for converting code data inputted from an external device into an image signal and inputting the image signal into the optical scanning apparatus.

* * * * *